United States Patent [19]
Doolittle et al.

[11] Patent Number: 5,797,215
[45] Date of Patent: Aug. 25, 1998

[54] APPARATUS AND METHOD FOR RETAINING INJECTION FLUIDS IN A TREE

[76] Inventors: Glayne D. Doolittle, 9647 Ruggles St., Omaha, Nebr. 68134; Mark O. Harrell, 536 W. Keating Cir., Lincoln, Nebr. 68521

[21] Appl. No.: 752,843

[22] Filed: Nov. 21, 1996

[51] Int. Cl.⁶ .................................................. A01G 29/00
[52] U.S. Cl. ............................................................ 47/57.5
[58] Field of Search ....................................... 47/57.5, 58

[56] References Cited

U.S. PATENT DOCUMENTS

| | | |
|---|---|---|
| 2,970,348 | 2/1961 | Imus et al. |
| 3,706,161 | 12/1972 | Jenson .................................. 47/57.5 |
| 3,864,874 | 2/1975 | Norris et al. ......................... 47/57.5 |
| 4,365,440 | 12/1982 | Lenardson ............................ 47/57.5 |
| 4,896,454 | 1/1990 | Cronenwett et al. ................. 47/57.5 |
| 5,114,032 | 5/1992 | Laidlaw ................................ 47/57.5 |
| 5,207,021 | 5/1993 | Merving ............................... 47/57.5 |
| 5,239,773 | 8/1993 | Doolittle, Jr. ........................ 47/57.5 |
| 5,478,394 | 12/1995 | Bidaux ................................ 47/57.5 |

FOREIGN PATENT DOCUMENTS

| | | | |
|---|---|---|---|
| 3942368 | 6/1991 | Germany | 47/57.5 |

Primary Examiner—Michael J. Carone
Assistant Examiner—Joanne C. Downs
Attorney, Agent, or Firm—Zarley, McKee, Thomte, Voorhees & Sease

[57] ABSTRACT

An injection retention plug is insertable into a hole in the outer bark layer of a tree so that upon injection of fluid through the plug to an area between the xylem and inner bark layers, the plug will fill the hole to block leakage of the injected fluid outwardly through the outer bark. The plug is of a size and shape to fill the cross-sectional area of the preformed hole in the outer bark. It includes a core of resilient material which is expandable upon withdrawal of the fluid injection device to fill the hole. A method for injecting fluids into a tree includes forming a hole in the outer bark, inserting the plug into the hole, injecting fluid through the plug for retention between the xylem and inner bark layers and allowing the plug to block leakage of fluid outwardly through the injection hole.

4 Claims, 3 Drawing Sheets

5,797,215

1

APPARATUS AND METHOD FOR RETAINING INJECTION FLUIDS IN A TREE

BACKGROUND OF THE INVENTION

1. Technical Field

The present invention is generally directed to a resilient plug adapted for placement within a preformed hole in the outer bark of a tree whereby upon insertion of a fluid injection device through the plug to inject fluids between the xylem and inner bark layers of the tree and upon withdrawal of the needle from the plug, the plug closes and seals the hole to substantially block passage of the injected fluids outwardly from the tree.

2. Description of the Prior Art

It has previously been known to form a hole in the exterior of a tree and to implant capsules of nutrients or treatment fluids into those holes. Representative tree injection capsules are disclosed in Jenson U.S. Pat. No. 3,706,161 and Norris et al. U.S. Pat. No. 3,864,874. Both patents show and suggest that the capsules are inserted into pre-drilled holes of a depth extending through and beyond the cambium layer of the tree. The drilling of a hole beyond the cambium layer of a tree, however, injures the tree and triggers a defensive reaction of the tree to wall off the injured area thereby losing stored food that would otherwise be available for growth. The size of the xylem is reduced and an air pocket in contact with the xylem allows decay.

Successful injection of nutrients and treatment chemicals into a tree was accomplished with the improved tree injection system of U.S. Pat. No. 5,239,773 wherein a specially designed fluid injection needle could be inserted at an angle through the bark of a tree to contact the xylem layer of the tree, but without penetrating or damaging the xylem layer. This system works best during the period of the year of active growth of the tree. In the midwestern United States, this period extends for two to three months, including June, July and some of August. Thereafter, the tree tends to shutdown and cannot as effectively hold the injected fluid in a bubble between the xylem and inner bark layers of the tree. Outside of the growing season, the injected fluid tends to leak outwardly through the hole formed by the fluid injection treatment. The present invention is designed to extend the portion of the year in which trees may be injected with fluids by plugging the hole into which the liquid chemicals are injected and preventing them from running out prior to being taken up by the tree. U.S. Pat. No. 5,239,773 describes at column 6, lines 23-27 that when the needle is removed, the bark and cambium close the needle hole because of their resiliency. This does not always happen early or late in the growing season, on certain trees such as the linden tree or on overcast days. This process of keeping the chemical in the tree is facilitated by the apparatus and method of the present invention.

A primary object of the present invention therefore is to provide an apparatus and method for successfully injecting fluids into trees and retaining the fluid in the tree until it can be naturally taken up by the tree.

Another object of the invention is to provide an apparatus and method for successfully injecting fluids into a tree, without leakage, throughout a longer period of the year than could be accomplished without the apparatus and method of the invention.

Another object is to provide an apparatus and method which enables more chemical to be injected and retained in a tree than could be injected and retained without the apparatus and method of the invention.

2

Another object of the invention is to enable the successful injection and retention of fluids in a tree without wounding the tree.

Another object is to provide an apparatus and method for injecting fluids into a tree which prevents air from penetrating the bark, thereby prohibiting the growth of fungus.

Another object of the invention is to provide an apparatus and method for injecting fluids into a tree which enables the injection of certain flowable chemicals which could not be effectively injected without the apparatus and method of the invention.

Another object of the invention is to provide an apparatus and method which enhances the performance of the tree injection system of U.S. Pat. No. 5,239,773.

Another object is to provide an apparatus and method for injecting fluids into a tree which increases the efficient use of the injected chemicals by preventing leakage of the chemicals from the tree.

Finally, an object of the invention is to provide an apparatus for retaining injected fluids in a tree, which apparatus is simple and rugged in construction, economical to manufacture and efficient in operation.

SUMMARY OF THE INVENTION

This invention is directed to an injection fluid retention plug for insertion into a hole in the outer bark layer of a tree for retaining injection fluid injected from a fluid injection device through said hole to a position between the xylem and inner bark layers of the tree. The plug is of a size and shape to fill the cross-sectional area of the preformed hole in the tree. It includes a core of resilient material penetrable by the injection needle for injecting fluids between the xylem and inner bark layers, which core is expandable upon withdrawal of the fluid injection needle to fill the hole and substantially block leakage of fluids outwardly through the hole.

The plug may be a solid integral block of resilient material such as silicone, neoprene or urethane preferably with a preformed axial slit to guide the injection needle through it. Alternatively, the plug may include a rivet-like shank and outer flange whereby the outer flange limits the depth of insertion of the shank to the point of contact of the outer flange with the outer bark. Barbs may be provided on the outer surface of the shank to retain the plug at the inserted position. In thin barked trees, the plug may be only partially inserted with an outer portion protruding from the tree. An inner flange may partially close the outer end of the shank to both retain the core of resilient material therein and to guide the fluid injection needle into the plug.

The method of injecting fluids into a tree, according to the present invention, includes providing a fluid injection needle with injection fluid therein, forming a hole in the outer bark of a size for passage of the injection needle therethrough and of a depth less than the depth of the xylem layer, and inserting a plug, including a core of resilient material, into the hole. The method further contemplates driving the fluid injection device through the plug and hole to contact the xylem layer, injecting fluid through the injection needle between the xylem and inner bark layers and withdrawing the fluid injection needle from the plug, thereby allowing the plug to expand and close the hole to substantially block leakage of the injected fluid outwardly therethrough.

DESCRIPTION OF THE PREFERRED EMBODIMENTS

Figure 1:
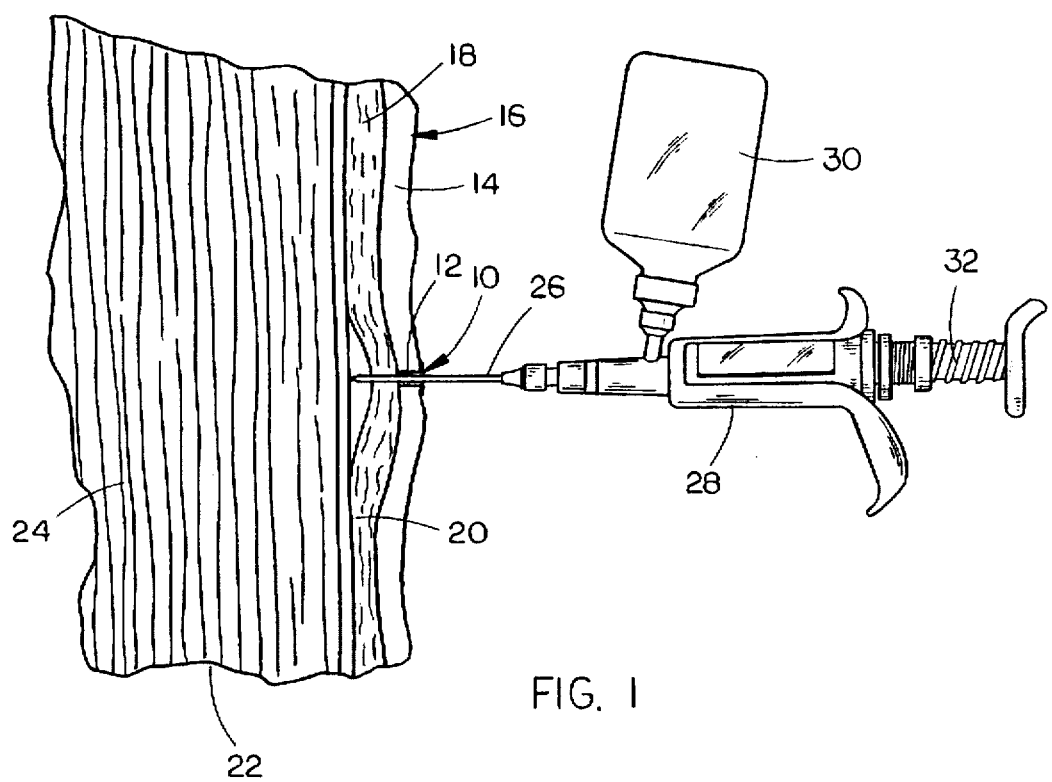
FIG. 1 is a sectional view of a tree showing a fluid injection device positioned for injecting fluid through the plug of the invention.

The plug 10 of the present invention is illustrated in FIG. 1 in a position installed within a hole 12 through the outer bark layer 14 of a tree 16.

Within the outer bark layer 14 is an inner bark layer 18 or phloem, a layer of vascular tissue that conducts and distributes sugars and other dissolved foods up and down that layer. The inner bark layer adjoins the cambium 20, a thin layer of formative cells which divide and differentiate to form new xylem and phloem tissue, which will eventually become wood and bark. Interiorally of the cambium is the xylem or sapwood 22 which conducts water up from the roots. The interior of the tree is the heartwood 24.

Figure 2:
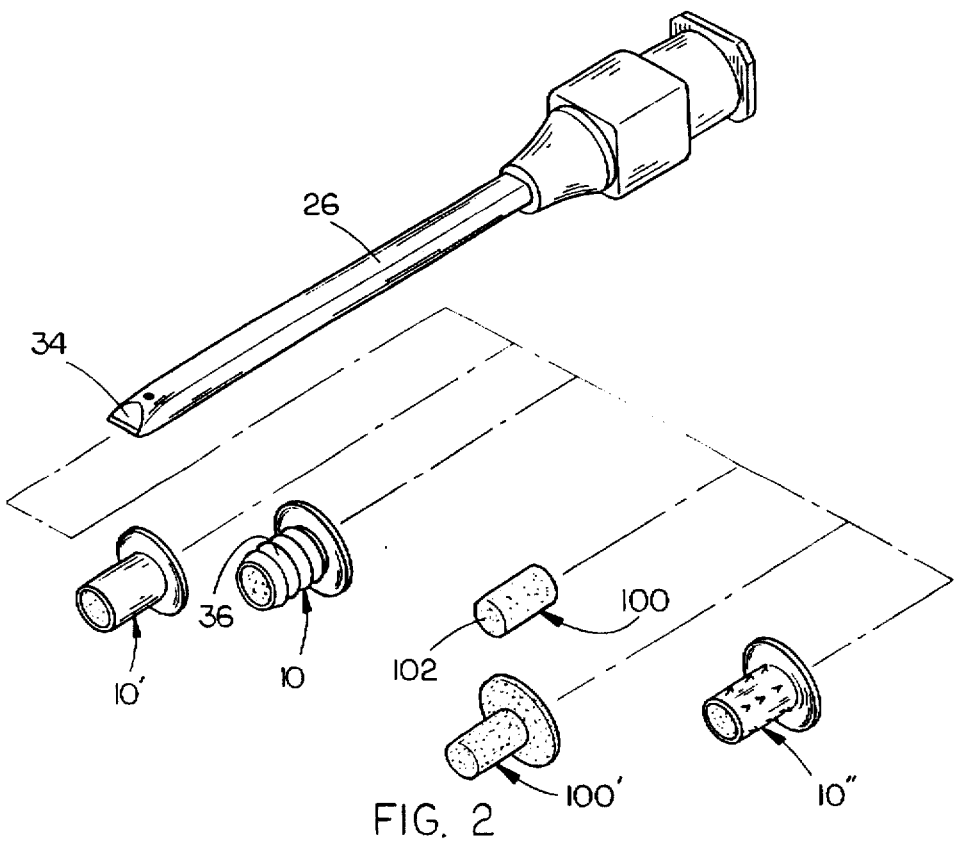
FIG. 2 is a perspective view of a fluid injecting needle in association with multiple embodiments of the plug of the invention.

FIG. 2 illustrates a special fluid injection needle for trees. This needle is of the type disclosed in U.S. Pat. No. 5,239,773. It is adapted for connection to an injection syringe 28 having a container 30 of injection fluid and plunger 32 for injecting fluid from the container 30 through the needle 26. Needle 26 has a wedge-shaped tip 34 to facilitate passage through the inner bark layer 18 and to be diverted downwardly upon contact with the xylem layer 22 if the needle is inserted at an angle. Whereas the plug 10 of the present invention is adapted for use with the special needle 26, it is equally adapted for use with any other type of injection needle or device.

FIG. 2 illustrates five alternate forms of the invention, including plug 10; 10', 10" and plugs 100 and 100'. Plug 100 is simply a bar shaped plug of a resilient material such as neoprene, silicone or fiberglass for example. Whereas those materials are preferred, any other operative resilient material may be used which accomplishes the purpose of the invention. Plug 100 preferably has a preformed axial slit 102 through its length to guide the injection needle 26 through it. Plug 100' is the same as plug 100 but with an integral flange 101.

Figure 4:
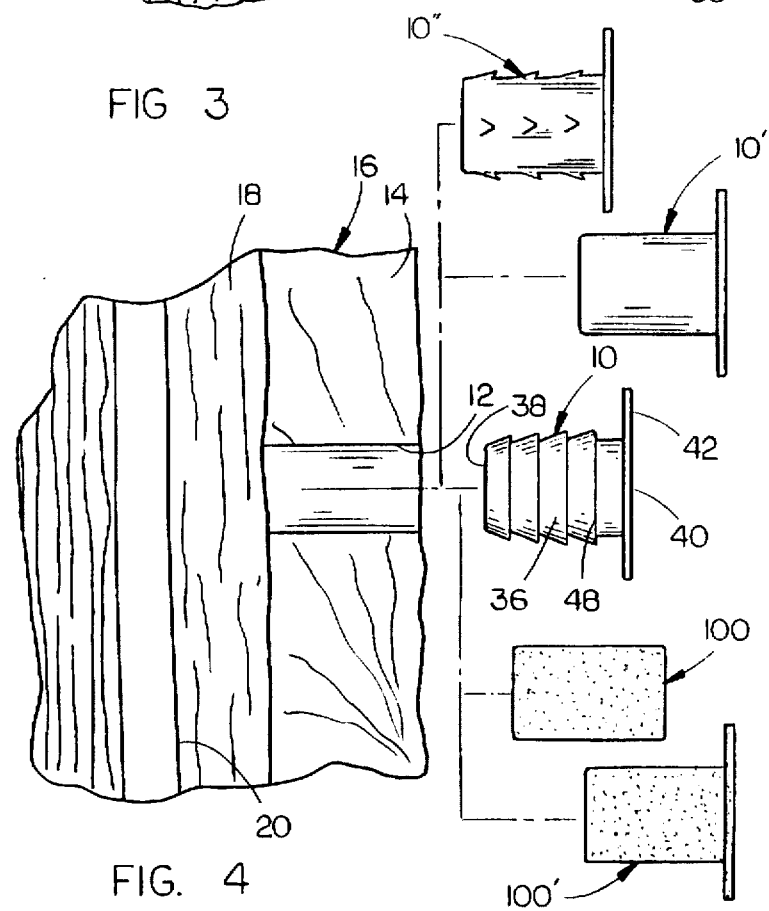
FIG. 4 is an enlarged partial side sectional view of a tree showing a plurality of plugs of the invention for insertion into a hole in the outer bark.

Plug 10 is illustrated in FIGS. 1 and 2 as including a generally tubular shank 36, preferably cylindrical, having inner and outer ends 38 and 40 and an outer flange 42 adjacent the outer end 40 and extending generally radially outwardly from the shank 36 for engaging the outer bark 14 of the tree to limit the depth of insertion of the shank 36 into the outer bark 14. The shank 36 likewise has an interior surface 44 and an exterior surface 36 with a plurality of barbs 48 on the exterior surface 46 to retain the shank 36 within hole 12. The barbs 48 may be formed as circumferential ridges as indicated in FIGS. 2 and 4 or they may comprise separate individual barbs 48" formed on a cylindrical exterior surface 46 of plug 10". The barbs are particularly helpful for securing the plug in position when it is not fully inserted into the hole 12. Plug 10' is an alternate embodiment without barbs on the cylindrical surface 46'.

Figure 5:
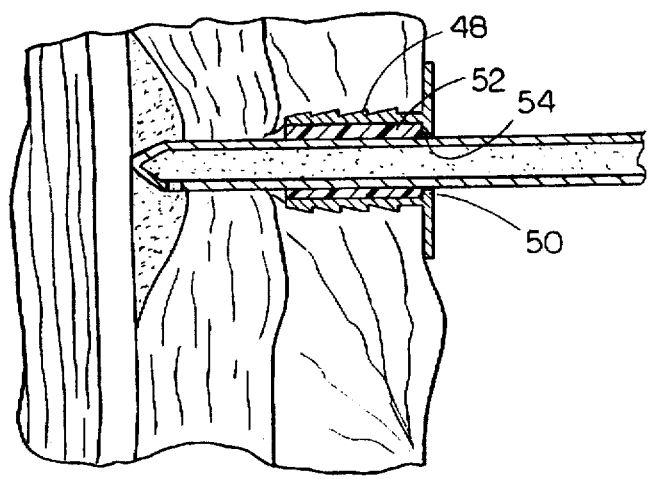
FIG. 5 is an enlarged partial sectional view showing a fluid injection needle extending through the plug of the invention for injecting fluid between the xylem and inner bark layers of the tree.
Figure 6:
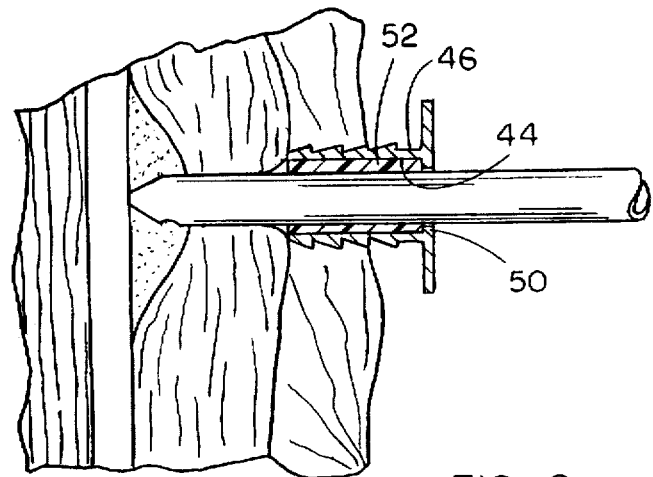
FIG. 6 is an enlarged partial side sectional view, similar to FIG. 5, but with the plug protruding outwardly from the thin outer bark of the tree.

In the sectional views of FIGS. 5 and 6, it can be seen that plug 10 may additionally include an inner flange 50 adjacent the outer end 40 of shank 36, which inner flange 50 extends generally radially inwardly of the shank 36 for retaining the core 52 of resilient material within the shank. The inner flange 50 includes a hole 54 of a size smaller than the interior cross-sectional area of the shank for receiving and guiding the injection needle 26 through the plug 10. The inner flange 50 may be tapered radially inwardly and axially outwardly relative to the shank to facilitate retention of the core 52 within the shank.

Core 52 preferably fills the shank and comprises a body of resilient material such as silicone, neoprene or urethane.

Figure 3:
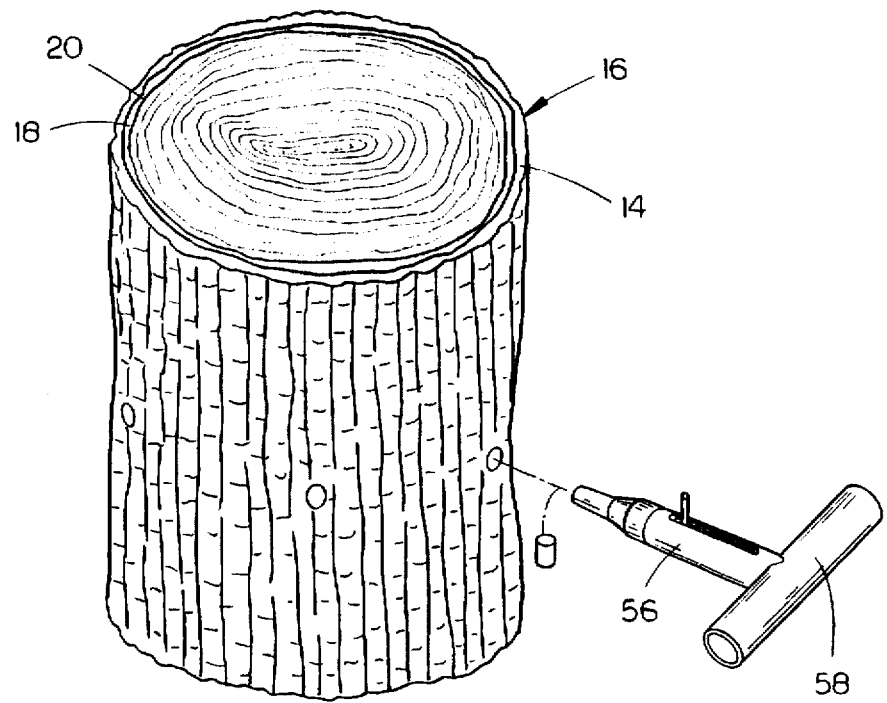
FIG. 3 is a foreshortened perspective view of the punch forming holes in the outer bark of a tree for receiving the plug of the invention.

In operation, a series of circumferentially spaced apart holes 12 are formed in the outer bark 14 of tree 16, as illustrated in FIG. 3. Suitable holes can be formed with a 3/16" punch 56 for leather making which is provided with a handle 58 or palm pad for forcing the small teflon impregnated tip 57 into the outer bark layer 14. The hole is preferably formed to the depth of the plug shank 36 but in no event be of a depth greater than the depth of the xylem layer 22 from the exterior surface of outer bark 14. Hole 12 preferably stops short of the xylem layer 22 so that there is some inner bark 18 between the inner end of hole 12 and the xylem 22. The hole 12 may be formed with or without a predrilled hole.

Upon formation of the hole 12, a plug 10, 10", 100' is inserted into the hole, preferably to substantially fill it. If the outer bark 14 is of a depth greater than the plug 10, the plug is fully inserted as illustrated in FIG. 5. If, however, the depth of the outer bark 14 is less than the depth of the plug as illustrated in FIG. 6, the plug is preferably only partially inserted so that an outer end portion remains protruding outwardly of the tree. It is preferable that the plug 10 not penetrate the phloem or inner bark 18, or only minimally if needed in the case of thin barked trees.

Figure 7:
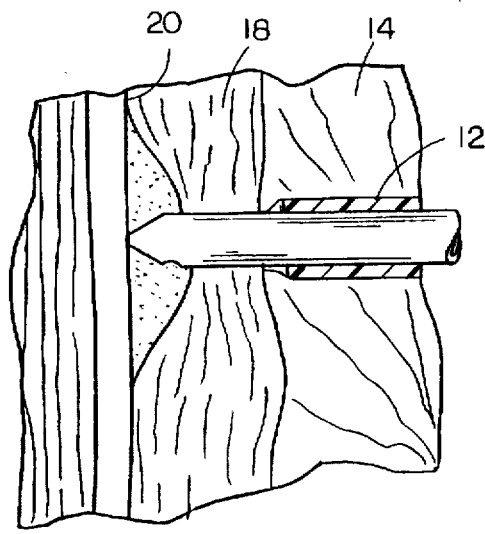
FIG. 7 is an enlarged partial side sectional view showing the fluid injection needle extending through a solid plug.
Figure 8:
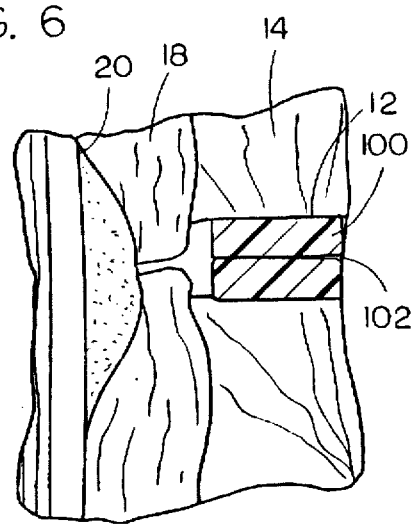
FIG. 8 is an enlarged partial side sectional view showing the solid plug upon withdrawal of the fluid injection needle.

Next, fluid is injected through the plug 10 or 100 to form a bubble between the xylem 22 and inner bark layer 18 as illustrated in FIGS. 5 through 7. One way of accomplishing this is with the fluid injection needle 26. The needle 26 is driven through the plug as illustrated in FIGS. 5 through 7 respectively to the point of contact with the xylem layer 22. At this point, fluid is injected through the needle to form the bubble 60 as shown. Upon withdrawal of the fluid injection needle 26, the resilient core of the plug 10 or 100 expands to fill hole 12 thereby substantially blocking leakage of the injection fluid outwardly through the hole, as illustrated in FIG. 8 for plug 100. Alternately, the fluid could be injected or blown in by an airless system much like needleless injections for humans.

Whereas the plug may be inserted into hole 12 prior to injecting fluid therethrough, the plug alternately may be fit onto the injection needle or device and inserted into hole 12 at the same time that the needle is inserted for injecting the tree.

Whereas the size and shape of the plug 10 and 100 are not critical to the present invention, a plug 10 of the size of a 1/8" rivet is suitable to accommodate a 16 gauge injection needle.

Larger and smaller plugs may be provided to accommodate larger and smaller injection needles or devices.

Thus there has been shown and described an apparatus and method for injecting fluids into trees and preventing the leakage of the injected fluid therefrom, which apparatus and method accomplish at least all of the stated objects.

We claim:

1. A method of injecting fluids into a tree having inner layers including heartwood surrounded by a xylem layer, and outer layers including a cambium layer surrounding the xylem layer, an inner bark layer surrounding the cambium layer, and an outer bark layer surrounding the inner bark layer, comprising the steps of:

providing an injection fluid within an injection device;

forming a hole directed inwardly through at least the outer bark layer but extending short of the xylem layer, said hole of a size for passage of said injection device therethrough;

inserting a plug, including a core of resilient material and an inward end, into the hole, said plug having a diameter great enough to plug the hole;

driving the injection device through the plug inwardly beyond the inward end of the plug, but short of the xylem layer;

injecting fluid from the injection device between the xylem and inner bark layers; and withdrawing the injection device from the plug; wherein the plug is formed of a material which seals the passage formed by the injection device upon removal of the injection device.

2. The method of claim 1 wherein said inserting step includes substantially filling said hole with said plug.

3. The method of claim 2 wherein said inserting step includes inserting said plug only partially into said hole whereby an outer end of said plug protrudes from said hole.

4. The method of claim 1 wherein said plug includes a tubular shank having inner and outer ends and an outer flange adjacent said outer end, said inserting step comprising inserting said plug to a depth to engage said outer flange against said layer of outer bark.

* * * * *